United States Patent [19]

Dunn et al.

[11] Patent Number: 5,134,564

[45] Date of Patent: Jul. 28, 1992

[54] COMPUTER AIDED RECONFILIATION METHOD AND APPARATUS

[76] Inventors: Eric C. W. Dunn, 1470 Arcadia Pl., Palo Alto, Calif. 94303; Thomas A. Proulx, 181 Mimosa Way, Portola Valley, Calif. 94025

[21] Appl. No.: 424,006

[22] Filed: Oct. 19, 1989

[51] Int. Cl.⁵ ............................................. G06F 15/30
[52] U.S. Cl. .................................... 364/406; 364/401; 364/408
[58] Field of Search ...................... 364/406, 401, 408; 382/7, 3, 4, 5; 902/4, 40

[56] References Cited

U.S. PATENT DOCUMENTS

| | | | |
|---|---|---|---|
| 4,047,154 | 9/1977 | Vitols et al. | 340/146.3 E |
| 4,417,136 | 11/1983 | Rushby et al. | 235/379 |
| 4,523,330 | 6/1985 | Cain | 382/7 |
| 4,737,911 | 4/1988 | Freeman, Jr. | 364/406 |
| 4,813,077 | 3/1989 | Woods et al. | 382/7 |
| 4,866,611 | 9/1989 | Cree et al. | 364/900 |

Primary Examiner—Jerry Smith
Assistant Examiner—Russell E. Cass

[57] ABSTRACT

A method of reconciling a first list (a bank statement) formed of a first number of first records and a second list (bank customer's list of records) formed of a second number of second records where the records affect the account balance for the bank statement. For each unmatched record in the first list, a corresponding record from the second list is selected based upon a match value. Whenever the match value exceeds a threshold value, the corresponding records from the first and second lists are paired and thereafter, are removed from further reconciliation processing. The highest match value resulting from comparing record elements and other attributes of records from the first and second lists is determined as a probable match for reconciliation.

26 Claims, 3 Drawing Sheets

COMPUTER AIDED RECONFILIATION METHOD AND APPARATUS

BACKGROUND OF THE INVENTION

1. Field of the Invention

The present invention relates to the field of automated systems for comparing and reconciling accounting records and more particularly to reconciling customer account information kept by a customer of a bank and corresponding account information kept by a bank.

2. Reconciliation Process Generally

Reconciliation is a process for comparing a bank statement prepared by a bank with corresponding customer information kept by a customer and for explaining the reasons for any differences resulting from the comparison. Typically, the final balance according to the bank statement is compared with the final balance according to the customer's information for a particular accounting period. Each individual transaction affecting the balance is compared.

3. Prior Art Generally

Many bank accounts are reconciled manually by bank customers. A bank customer visually compares a printed bank statement and corresponding customer accounting information. The visual process tends to be time-consuming, tedious, and error-prone.

To reconcile an account, the customer or other reconcile typically sorts the records into numerical order and arranges the cancelled checks and other bank statement records together with the customer's own accounting information so that they are all in view. For each transaction record on the bank statement, the customer visually scans the customer's own accounting information to identify a matching transaction record. Typically transactions are visually matched based on amount, serial number if any, and date range. If a bank transaction is paired with an identical customer transaction, the customer marks the paired records and continues to the next record until all records have been examined. If a close but not perfect match is found, the customer must determine the reason for the discrepancy. Then either the bank or the customer must correct any erroneous or missing information. After all records are matched and discrepancy noted, the reconciler totals (1) the amounts of checks listed in the customer records that have not yet cleared the bank, (2) the customer deposits not entered by the bank, and (3) bank transactions that the customer has not entered. The customer then calculates the correct ending balance as follows: True ending balance equals bank ending balance plus outstanding deposits or credits minus outstanding checks or debits. If the calculated ending balance equals the ending balance in the customer's accounting information, reconciliation is complete. If the balances do not equal, the reconciler must search for discrepancies or errors and correct them until the account is reconciled.

Many banks offer a comparison service to help reconcile customers' accounts. For such services, each participating customer provides a copy of the customer's accounting information to the bank, usually in electronic form such as on disk, on tape or by computer transmission in a format specified by the bank. The bank enters the customer accounting information into the bank's computer. The bank's computer also contains the bank statement information for the customer. The bank's computer compares the bank and customer accounting information to prepare a report for the customer identifying discrepancies. Typically, the bank makes no effort to reconcile any discrepancies.

Some banks provide customers with a bank statement in electronic form. Typically, a customer electronically enters the data from the electronic bank statement into the customer s computer and the customer's computer compares the bank data with the customer's data, but this method offers no assistance in resolving discrepancies.

For bank customers, the number of records processed per month or other accounting period can vary greatly depending on the nature of the customer. For personal accounts, the number of checks, withdrawals, and other records on a monthly statement may range from a few to several hundred. For customer accounts of businesses, the number of records per month may be in the thousands. Usually, a high percentage of the records for each transaction period are easily matched and therefore reconcilable with little difficulty. However, differences between records from a bank statement list of records and a customer's corresponding list of records for the same accounting period can be 2% or higher of the total number of records.

For a customer's account which has an average of four thousand records per month and a 2% difference rate, eighty non-identical records must be reconciled because of some discrepancy between the bank listing and the customer listing. At the time of reconciliation, a customer will normally have entered records into the customers accounting information for transactions in the next accounting period so that the customer's list of records is usually larger than the bank's list of records and this difference makes the reconciliation process more difficult.

In general, for checking accounts, the elements for each record which are compared include the date of the check, the number of the check, and the amount of the check. These elements are selected for comparison because the bank conventionally supplies the information to a customer with the customer's list of records with the monthly bank statement. However, many transactions in addition to checks occur in a checking account and require attention in order to reconcile the bank list with the customer list of records.

For example, bank service charges of many different types are entered by the bank into the bank statement and often this information is not added to the customer's list of records. Other transactions which appear on records on a bank list include credits, reversal of charges, and insufficient funds transactions. These bank records often lead to discrepancies between a bank listing of records and a corresponding customer listing of records.

Other sources of discrepancies between the bank listing and the customer listing are errors in records that are introduced either by the bank or by the customer. For example, one common error is the transposition of digits in either the date element or in the amount element. Another common type of error is the omission of a check number. Also, certain records in a bank listing have no record number. For example, bank service charges or withdrawals from automatic tellers ATMs) have no "check" number.

The difficulty of reconciling records having discrepancies due to errors can become complex and is a function of the number of records having discrepancies, the number of records in one listing having no corresponding records in the other listing, and in the nature of errors causing discrepancies. For example, if a business tends to write a large number of checks for similar dollar amounts on similar dates, it is difficult to correlate visually a record in a bank list with a similar record (particularly when a difference due to an error or otherwise exists) in the customer list. Such a correlation is further compounded if transactions of like or similar dollar amounts omit a check number for reasons of error or otherwise.

The amount of time required to visually correlate and match erroneous information can be excessive. Even when computers are employed to do a comparison of records which are easily matched because the elements in the records are identical, the reconciliation of the unmatched (and sometimes erroneous) records can be highly time consuming.

The problem of reconciliation extends to other types of accounts, also. For example, reconciliation of a list of records from a credit card statement provided by a credit card issuer with a customer's own list of credit card records is often more difficult than checking account reconciliation. The increased difficulty occurs because credit card statements usually only identify the amount and date of the transaction without the equivalent of a transaction number (such as the check number usually present on checks in a checking account). Because there are fewer elements to use in the comparison of information, credit card account reconciliation proves quite difficult when attempted visually.

While the above and other methods compare lists of accounting records to identify discrepancies, none of those methods adequately assist in reconciliating discrepancies.

In accordance with the above background of the invention, there is a need for improved methods and computer software for use with computers in reconciling periodic listings of accounting records.

SUMMARY

The present invention is a method of reconciling a first list formed of a first number of first records and a second list formed of a second number of second records. The first list is typically a bank statement including as records the checks and other transactions affecting the account balance that have occurred during the accounting period for the bank statement. The second list is typically the customer's own list of records including the checks and other transactions affecting the customer's account balance.

For each unmatched record in the first list, a corresponding record from the second list is selected based upon a match value. Whenever the match value exceeds a threshold value, the corresponding records from the first and second lists are paired and thereafter, are removed from further reconciliation processing. The match value is determined as a result of comparing record elements and other attributes of records from the first and second lists. The highest match value for an unmatched record in the second list relative to a selected record in the first list is proposed as a match. The probable match, as determined by the highest match value, is selected or rejected either by human intervention or by automatic processing. For each probable match accepted, the accepted match pair, including a record from the first list and a record from the second list, is then removed from further processing. The probable matching steps are repeated until all acceptable probable matches have been determined. Thereafter, if unmatched records exist in the first list, further processing continues. For example, if no probable match exists, it may be determined that the lack of a likely match results from the omission of a record in the second list and the match can be made by insertion of a corresponding record in the second list so that a matched pair in the first and second list results. For example, such a record insertion often is necessary in a customer listing to correspond with a service charge in the first listing from a bank statement.

Typically, a second list such as a customer list will have many unmatched records after all of the records from the bank statements first list have been matched. These unmatched records represent transactions that are likely to appear on the bank statements for the next accounting period.

The method of determining the match value relies upon assigning probability values to differences between elements being compared where the elements for a checking account are typically the record number for a check, the record date, and the record amount. Furthermore, different characteristics of each of the elements are analyzed and any discrepancies in such characteristics are also assigned probability values.

The match value is determined by summing all of the individually assigned probability characteristics for each of the elements compared and for each of the characteristics of each of the elements compared. In one embodiment, the match value is quantized into 38 different levels.

In a simple three level example of a match value, the record element is $\frac{1}{3}$, the record amount is $\frac{1}{3}$, and the record data is $\frac{1}{3}$. If a comparison of a record from the first list with a record from a second list finds identity in the date element, the record number element and the record amount element, then the match value is 1. If the record number and the record date are identical, but the record amounts are different, then the match value is $\frac{2}{3}$.

If, in comparing one record element from the first list with unmatched record elements in the second list, one particular record element in the second list has match value of $\frac{2}{3}$ because the record number and date are the same, and all other records in the second list have a match value of $\frac{1}{3}$ (for example, the date is the same but the record number and the record amount are different), or none of the elements are the same, then the most probable match of the first record with a record in the second list is the one with the match value of $\frac{2}{3}$.

While this example of a 3 level match value demonstrates the principle, it has been found to be unsatisfactory for general use. For example, if a business writes checks for the same amount on the same date to numerous payees and an error occurs in the amount of one check, many different consequences may result during the reconciliation process. For example, for all those checks for the same amount on the same date with different check numbers will have a match value of $\frac{1}{3}$. There will be no distinction between the correct check with an erroneous field and all of the other incorrect checks without corresponding fields.

While many different levels for match values can be established, several match characteristics of elements have been found important for efficient probable match correlation. One important factor is the date window. In considering probable matches of a record from the first list with a record from a second list, a higher contribution to the match value is important for those record dates which are within a predetermined range relative to the record date in the first list.

Another important characteristic in establishing a probability value for the match value is that the record amount in the second list be within a small percentage difference from the record amount in the first list. For example, a record difference of not greater than 10% has been found useful.

Another characteristic of the matching process which is important is that the absence of any particular element in a record does not preclude that element from being considered as a probable match. For example, the omission of a check number does not disqualify a record from being a probable match for a record in the first list, particularly when the record amount and the record date are identical. While the absence of an element or a particular characteristic of an element may reduce the match value, it does not disqualify the record from a probable match, particularly if the match value for that record is high relative to the match values of other unmatched records.

To accomplish this task, it brings together and employs, in appropriate compatible format, computer information from both the account holder and the bank.

The present invention reduces the amount of human time and effort required to accomplish the task of bank account reconciliation.

The present invention provides a means to use existing accounting information with little or no modification needed.

DETAILED DESCRIPTION

The reconciliation process includes two distinct but related and coordinated procedures which take place at different locations and at different times; namely at a bank and at a bank account customer's home or business.

BANK PROCEDURES

Banks routinely keep computerized information of all transactions that affect the checking accounts of bank account customers. Such transactions may be originated by the customer, the bank, or a third party. The transactions may or may not originate with paper documents, but the bank converts the transactions to electronic information and stores them in computer files. At accounting intervals known as statement cycles, the bank provides each customer with a summary list of all transactions affecting the customer's account. Such summaries called bank statements, are delivered to customers on paper or in various electronic forms.

When banks periodically send their customers electronic versions of their bank statements, most often, banks send the customer a floppy disk in the mail, but some banks will convey the data over a modem line to the customer's computer from the bank's computer.

Figure 1:
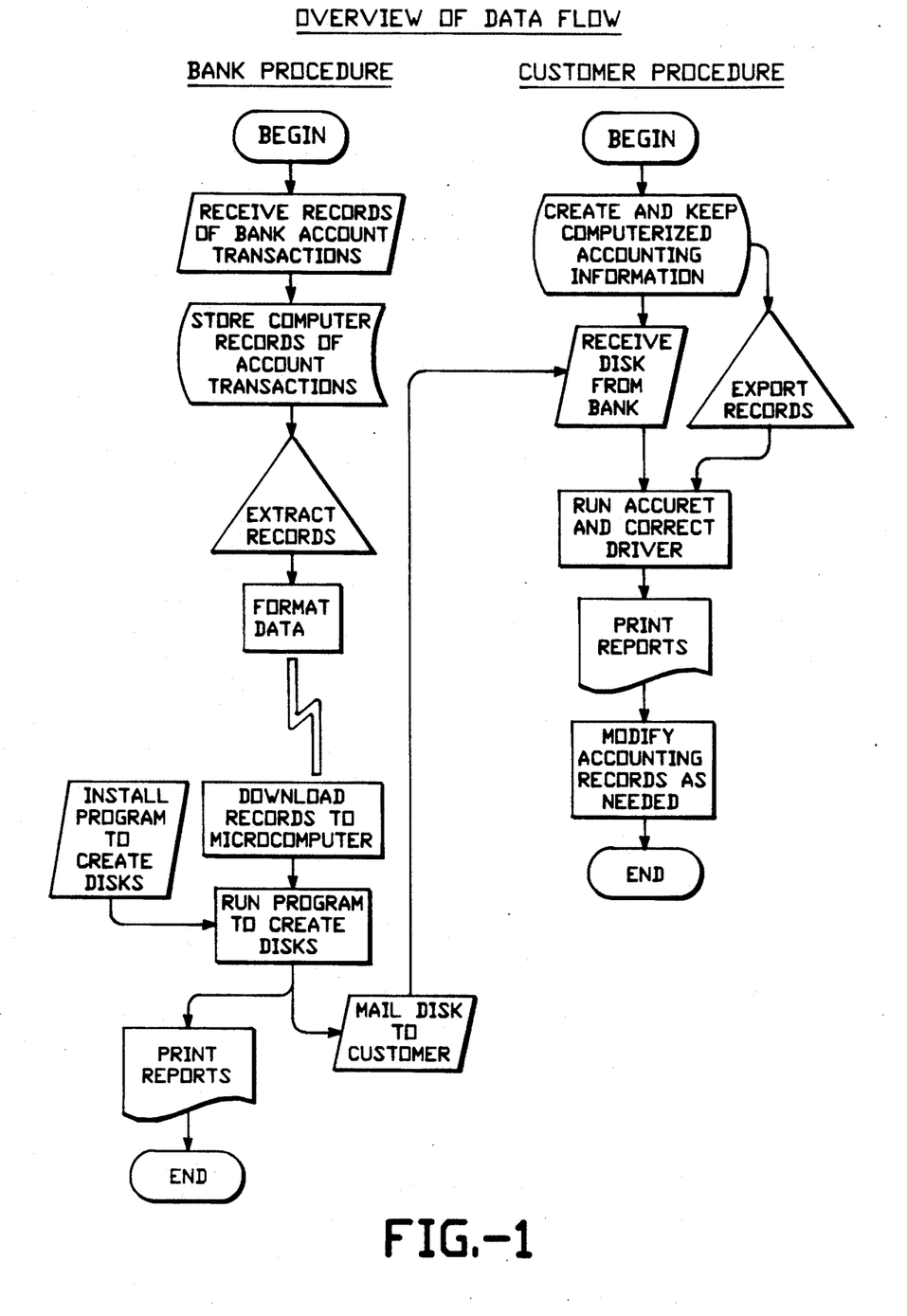
FIG. 1 depicts a flow diagram of the bank account processing which occurs to create an electronic bank statement for sending to a bank customer together with the customer processing which occurs to establish the bank list from the bank and the customer list from the customer.
Figure 2:
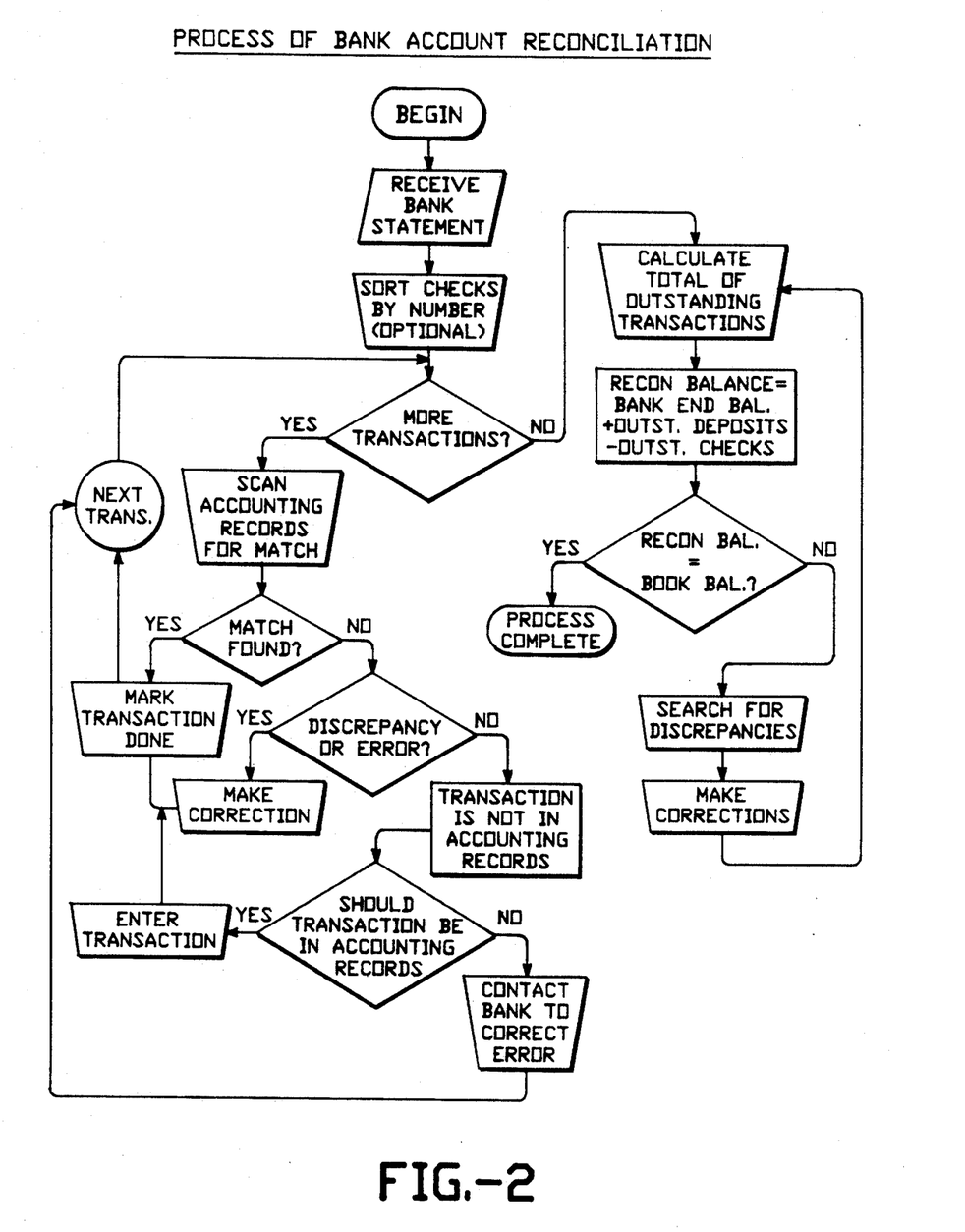
FIG. 2 depicts the reconciliation process which occurs with the electronic bank list and the electronic customer list in a computer.

FIG. 1 shows a typical bank computer procedure used to produce disks for its customers. The bank first establishes a computerized way to identify customers that are to receive electronic bank statements. Then the bank extracts the necessary bank statement data for each customer at regular intervals. The bank computer program reads the appropriate data files, extracts the needed data for the selected customers, formats the data (typically to ASCII specifications), and makes the data available for downloading to floppy disks. The extracting and downloading are accomplished by means of conventional programs specific to the banks own computer methods of storing data. Typically, the data is downloaded to a microcomputer or other computer tailored to produce floppy disks for customers.

Once the downloading is accomplished, the bank's data is typically converted to a compressed format, sorted by customer account, associated with descriptors (such as "Check" or "Deposit") for each customer transaction, and associated with a name/address and disk size for each customer. The finished disk for each customer is mailed to the customer.

Customer Procedures

Individuals and businesses often use computers and various software to keep accounting information of the transactions made on their checking or other bank accounts. As indicated in FIG. 1, the customer accounting information is electronically stored within a customer computer or on computer media such as disks or tapes. The customer information may be retrieved and examined to accomplish account reconciliation or other purposes.

Processes for reconciling accounts vary depending on the individual customer. The prerequisites for account reconciliation are (1) a bank account statement, and (2) customer accounting information.

The present invention accomplishes the reconciliation process using a computer. The customer account holder keeps computerized accounting information and typically receives a computerized bank account statement from the bank. The customer accounting information typically incorporates a number of "drivers", which are programs that read accounting information from publicly available software packages. Drivers may directly read accounting data from a particular software package, or they may indirectly read information that the reconciler has created via a function of the software used to create the information. In either case, the customer typically uses the customer's existing information created over the accounting period, rather than requiring a re-keying of each transaction, or the customer uses data extracted from existing accounting information by means of basic export functions rather than requiring new programming to make the data usable. Once both the customer's and the bank's information, are loaded into the computer, the reconciliation process commences. If discrepancies are found, the process displays a bank statement record on a screen along with the closest match found. The user chooses among several potential courses of action to resolve the discrepancy. When all transactions from the bank statement have been paired or corrected, the customer may choose to print reconciliation reports. The customer can change the customer account information, or contact the bank to change theirs, depending on which party made errors, if any. Reconciliation is then complete. This process is repeated whenever a bank statement is produced, often monthly.

Automating the bank reconciliation process requires bringing the customer's data and the bank's data together on a computer. Once the data is available, it must be matched up accurately and rapidly. To fully automate the matching process, the software must provide an efficient method for dealing with discrepancies between the customer's information and the bank's statement. Frequently, coping with the discrepancies is the most time-consuming part of reconciling a bank statement. The present invention provides a deterministic, error-free approach to reconciling which quickly deals with exactly-matching records and then handles the non-exactly-matching records in an efficient manner.

Figure 3:
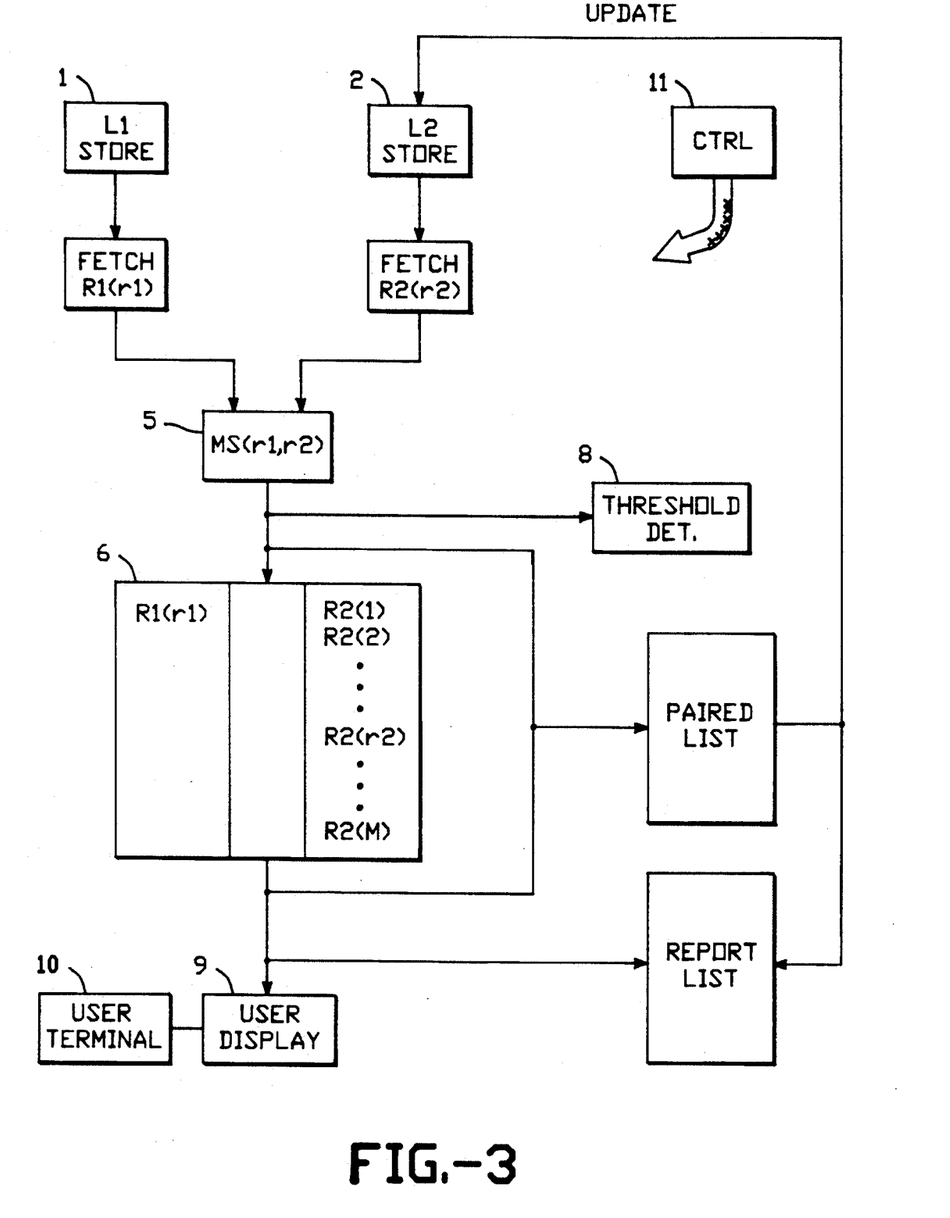
FIG 3 depicts a block diagram of the reconciliation method and apparatus of the present invention.

FIG. 3 depicts a computer apparatus for performing the reconciliation method of the present invention. The apparatus of FIG. 3 can be a general purpose computer, such as an IBM personal computer, or can be a special purpose computer for performing the method of the present invention. In FIG. 3, the store 1 is a mainstore or other store for storing the list L1 records associated with a bank statement. The store 2 is a mainstore or other memory for storing the customer records for the customer list L2. Under control of the controller 11, each of the records R1(r1) is fetched from the store 1 into the register 3 for comparison with each of the records R2(r2) from the L2 list of store 2. For each R1(r1) record in register 3, unpaired ones of the N records in the L2 list are fetched into the register 4. For each record R2(r2) in register 4, a comparison is made with the record R1(r1) in register 3 in order to calculate a Match Score, MS(r1,r2) in the Match Score calculator 5. The results of the Match Score from the coagulator 5 are sensed in the threshold detector 8. If the Match Score, MS(r1,r2), from calculator 5 exceeds the pairing threshold, the threshold detector 8 causes the pairing of R1(r1) and R2(r2) to be marked in the paired memory 7. If not exceeding the pairing threshold, then the Match Score for the record R1(r1) and R2(r2) is stored into the temporary memory 6. After processing all of the N records from the L1 store 1 and determining all of the paired records in the pairing memory 7, the unpaired records corresponding to the Match Scores for the R1(r1) records appear in the temporary memory 6. For each unpaired record R1(r1), the highest Match Score values for a group of records R2 are presented on a user display 9 for view by a user at a user terminal 10. The user terminal 10 has an opportunity to select a record in the group of records on display 9. If a selection is made, the selected pair of records are entered into the pair memory 7. This process is repeated for all unmatched records from the L1 store 1 appearing in the temporary store 6.

Reconciliation Process

1. The computer stores two separate lists of transactions, for example, the Bank Statement List from the bank and the Check Register List from the bank customer. The Bank Statement List is a list of bank transactions which have cleared the bank in the most recent processing cycle for an accounting period. The Check Register List is a list of records for bank transactions as maintained by the customer and which have not been reconciled to a prior bank statement. In general the Check Register List will be longer than the Bank Statement List because it will contain transactions dated after the ending date of the accounting period for the Bank Statement List.

Each list includes a number of records such as checks, deposits, fees or other transactions affecting the account balance. Each record typically includes a number of elements. Typical elements for a checking account are a date, a check number, an amount, a payee, a payor, and an account number. Some records do not have all elements. For example, bank fees do not have any check or other transaction number.

By way of definition, the Bank Statement List is the first list, L1, and it has N first records designated R1(1), R1(2), ..., R1(r1), ..., R1(N) where each one of the records R1(r1) is formed of up to P elements E1(1), E1(2), E1(3), ..., E1(e), ..., E1(P).

Similarly by way of definition the Check Register List is the second list L2 and it has M second records designated R2(1), R2(2), ..., R2(r2), ..., R2(M) where each one of the records R2(r2) is formed of P elements E2(1), E2(2), E2(3), ..., E2(e), ..., E2(P). Typically, M is greater than N because the customer list includes checks which have not yet been processed by the bank.

2. Starting with the first record, R1(1), in the Bank Statement List, L1, the computer generates a match score for one or more of the as-yet-unmatched records in the Check Register List, according to a scoring method described below. The match scores calculated have a score range, for example, from 0 to 100. Specifically, record R1(1) is compared with R2(1) to obtain a match score MS(1,1) having a value between 0 and 100. Next, R1(1) is compared with R2(2) to obtain a match score MS(1,2) between 0 and 100.

3. The computer compares each match score produced to a fixed number pairing threshold, $P_{match}$. If the match score exceeds $P_{match}$, the corresponding Check Register List record, R2(e), is considered an exact match and is paired with the selected Bank Statement List record. This pairing constitutes reconciliation for the paired records and completes processing for those paired records, R1(1) and R2(e). Thereafter, R1(1) is compared with R2(3), R2(4) and so on to obtain match scores MS(1,3), MS(1,4) and so on.

If the match score does not exceed $P_{match}$ for R1(1), the Bank Statement List record R1(1) is temporarily set aside and processing proceeds with the next Bank Statement List record, for example, R1(2).

4. Processing of Bank Statement List records continues in this fashion for all of the records R1(1), R1(2), ..., R1(N) to find those that can be exactly matched and paired with R2(1), R2(2), ..., R2(M) records.

5. Once all of the records which can be exactly matched have been paired, the matching process is restarted at the first Bank Statement List record R1(r1) which has not yet been paired to some Check Register List record, R2(r2).

Match scores for each of the Check Register List records which have not yet been paired to a Bank Statement List record are ordered from high to low. A group of Check Register List records is matched to a first one of the unpaired Check Register List records. For example, the selected group includes the ten highest match scores, provided each of the match scores exceeds a fixed number no-match threshold, $P_{nomatch}$, is successively highlighted, in order of descending match score, for presentation to the user for user acceptance or user rejection. If the user verifies that the highlighted Check Register List record matches the current Bank Statement List record, the records are paired and processing for the current Bank Statement List record is complete. If the user rejects the suggested pairing, the Check Register List record with the next-highest match score is highlighted for the user.

If the user rejects all of the ten highest-scoring records, or all of those records having a match score which exceeds $P_{nomatch}$, the user is given an opportunity to add a record to the Check Register List and have the added record paired with the current bank Statement List record. If the user confirms that a record should be added, processing is terminated for this step; otherwise the entire cycle is repeated from the selection of the 10 highest match scores remaining.

6. Processing of the non-exact matches continues in the fashion described above under 5, until all of the Bank Statement List records have been matched either to pre-existing check Register List records or to new Check Register List records created during the process.

Calculation of the Match Scores For Two Typical Records. R1(r1) and R2(r2)

The method for calculating match scores, MS, must be precise enough so that the majority of pairingss are completely automatic, but discriminating enough so that spurious matches are not made. In order to make the semi-automatic pairing process (for non-exact matches) efficient, the matches need to be for plausible pairings and need to be presented in a logical order.

To achieve these objectives, is one embodiment, a set of matching rules that produce 38 different match scores have been found to work well in a typical accounting environment. For example, in the "amount" element comparison, a relatively high match score results if the compared amounts are the same except for a digit transposition. In the "date" element comparison, experience-based rules for determining how long various records take to clear the bank affect the match score Match scores, $MS(r1,r2)$, between a first list, L1, record R1(r1) and a second list, L2, record R2(r2) are calculated as follows:

---

If $P_{date}(d1,d2,c1) = 0$, $MS(r1,r2) = 0$.
If $P_{date}(d1,d2) \neq= 0$, $MS(r1,r2) = (P_{date}(d1,d2,c1) + P_{amount}(a1,a2) + P_{number}(c1,c2))/3$
where, $P_{date}(d1,d2,c1) =$ the Date Score probability value set as a function of comparing the [Adates in the date elements d1 and d2 of R1(r1) and R2(r2), respectively, as a function of the number element, c1.
$P_{amount}(a1,a2) =$ the Amount Score probability value set as a function of comparing the amounts in the amount elements a1 and a2 of R1(r1) and R2(r2), respectively.
$P_{number}(c1,c2) =$ the Number Score probability value set as a function of comparing the numbers in the number elements c1 and c2 of the records R1(r1) and R2(r2), respectively.
$MS(r1,r2) =$ Match Score probability value set as a function of comparing R1(r1) and R2(r2) records.

--- d1 = Date of record R1(r1) from Bank Statement List
d2 = Date of record R2(r2) from Check Register List
a1 = Amount from record R1(r1) of Bank Statement List
a2 = Amount from R2(r2) of Check Register List
c1 = Check Number frin recird R1(r1) (or 0 if none) of Bank Statement List
c2 = Check Number from record R2(r2) (or 0 if none) of Check Register List

Calculation of the Date Score

The Date Score, $P_{date}(d1,d2,c1)$, is determined as one of the date score probability values, $sd_i$, in TABLE 1 as follows:

---

$P_{date}(d1,d2,c1) = sd_i$ where i has one of the values 1, 2, ..., 6.
$dd = (d1 - d2)$
$sd_i =$ one of the date score probability values determined by TABLE 1.
$i = 1, 2, ..., 6$

---

TABLE 1

Calculation of the Amount Score

The Amount Score, $P_{amount}(a1,a2)$, is determined as one of the amount score probability values $sa_i$ as follows:

---

$P_{amount}(a1,a2) = sdi$ where i has on of the values 1, 2, ... 26.
$sd_i =$ one of the amount probability values determined by TABLE 2.
$i = 1, 2, ..., 26$
$g1 =$ sign of a1
$g2 =$ sign of a2
$11 =$ number of digits in a1
$12 =$ number of digits in a2
$D =$ number of digits differing in a1, a2 (stopping the comparison at the end of the shorter of the two if their lengths differ)
$T =$ sum of the arithmetic digit-wise difference between a1 and a2 (using only as many digits as are present in the shorter number)

TABLE 2

Calculation of the Number Score

The Number Score, $P_{number}(c1,c2)$, is determined as one of the number score probability values $sn_i$ in TABLE 3 as follows:

$P_{number}(c1,c2) = sn_i$ where $i$ has one of the values 1, 2, ..., 6.
$sn_i =$ one of the number probability values determined by TABLE 3.
$i = 1, 2, ..., 6$.

TABLE 3

Typical probability values for $sd_i$ of TABLE 1, $sa_i$ of TABLE 2, and of $sn_i$ of TABLE 3 are given in the following TABLE 4. With the values of TABLE 4, the value of the pairing threshold, $P_{match}$, is typically 96 and the value of the exclusion threshold, $P_{nomatch}$, is typically 50.

TABLE 4

| | | |
|---|---|---|
| $sd_1 = 100$ | $sd_2 = 50$ | $sd_3 = 10$ |
| $sd_4 = 90$ | $sd_5 = 40$ | $sd_6 = 20$ |
| $sa_1 = 60$ | $sa_2 = 30$ | $sa_3 = 50$ |
| $sa_4 = 25$ | $sa_5 = 40$ | $sa_6 = 20$ |
| $sa_7 = 50$ | $sa_8 = 25$ | $sa_9 = 25$ |
| $sa_{10} = 12$ | $sa_{11} = 100$ | $sa_{12} = 50$ |
| $sa_{13} = 80$ | $sa_{14} = 40$ | $sa_{15} = 80$ |
| $sa_{16} = 40$ | $sa_{17} = 30$ | $sa_{18} = 15$ |
| $sa_{19} = 70$ | $sa_{20} = 35$ | $sa_{21} = 50$ |
| $sa_{22} = 25$ | $sa_{23} = 20$ | $sa_{24} = 10$ |
| $sa_{25} = 20$ | $sa_{26} = 10$ | |
| $sn_1 = 20$ | $sn_2 = 100$ | $sn_3 = 80$ |
| $sn_4 = 40$ | $sn_5 = 60$ | $sn_6 = 20$ |

An example of the operation of the present invention is given for a bank statement list, L1, in TABLE 5 having the records R1(1), R1(2), R1(3), ..., R1(M). In TABLE 5, only the three L1 records R1(1), R1(2), and R1(3) are explicitly shown. The example of the operation of the present invention also uses a customer list, L2, in TABLE 6 having the records R2(1), R2(2), R2(3), ..., R2(n). In TABLE 6, only the eleven L2 records R2(1), R2(2), ..., R2(11) are explicitly shown.

TABLE 5

L1-Bank List

| R1 | Type | Date | Number | Amount |
|---|---|---|---|---|
| 1 | Deposit | 7/6/88 | | 1,988.00 |
| 2 | Check | 7/7/88 | 3386 | 1000.50 |
| 3 | Deposit | 7/6/88 | | 572.59 |
| 4 | Fee | 7/30/88 | | 2.50 |
| . | | | | |
| . | | | | |
| M | Check | | | |

TABLE 6

L2-Customer List

| R2 | Type | Date | Number | Amount |
|---|---|---|---|---|
| 1 | Deposit | 7/5/88 | | 9,188.00 |
| 2 | Deposit | 7/6/88 | | 19,906.96 |
| 3 | Deposit | 7/4/88 | | 9,733.49 |
| 4 | Deposit | 7/7/88 | | 3,829.68 |
| 5 | Check | 7/5/88 | 3391 | 214.50 |
| 6 | Check | 7/5/88 | 3392 | 394.17 |
| 7 | Check | 7/5/88 | 3393 | 214.34 |
| 8 | Check | 7/5/88 | 3389 | 3,513.74 |
| 9 | Check | 7/5/88 | 3390 | 4,687.53 |
| 10 | Check | 7/5/88 | 3386 | 1000.50 |
| 11 | Deposit | 7/5/88 | | 572.59 |
| . | | | | |
| . | | | | |
| N | Check | | | |

The comparison process begins by comparing, in comparing steps C(1,1), C(1,2), ..., C(1,11) one of the L1 records, R1(1), with the L2 records R2(1), R2(2), ..., R2(11) in an example where N equals eleven to form the corresponding match scores, MS(1,1), MS(1,2), ..., MS(1,11). The results of the comparison and the match scores calculated are listed in TABLE 7. In TABLE 7, note that none of the match scores exceeds the pairing threshold, $P_{match}$, value of 96 and therefore none of the records of L1 and L2 are paired at this time.

TABLE 7

R1(1)- L2 Compare

| C | R1 | R2 | Match Score | Paired |
|---|---|---|---|---|
| 1 | 1 | 1 | <96 | NO |

TABLE 7-continued

| | | R1(1)- L2 Compare | | |
|---|---|---|---|---|
| C | R1 | R2 | Match Score | Paired |
| 2 | 1 | 2 | <96 | NO |
| 3 | 1 | 3 | <96 | NO |
| 4 | 1 | 4 | <96 | NO |
| 5 | 1 | 5 | <96 | NO |
| 6 | 1 | 6 | <96 | NO |
| 7 | 1 | 7 | <96 | NO |
| 8 | 1 | 8 | <96 | NO |
| 9 | 1 | 9 | <96 | NO |
| 10 | 1 | 10 | <96 | NO |
| 11 | 1 | 11 | <96 | NO |

The comparison process continues by comparing, in comparing steps C(2,1), C(2,2), ..., C(2,11) one of the L1 records, R1(2), with the L2 records R2(1), R2(2), .., R2(11) in an example where N equals eleven to form the corresponding match scores, MS(2,1), MS(2,2), ..., MS(2,11). The results of the comparison and the match scores calculated are listed in TABLE 8. In TABLE 8, note that the match score, MS(2,10) for the comparison, C(2,10), is 100 indicating an exact match which exceeds the pairing threshold, $P_{match}$, value of 96 and therefore the bank record R1(2) is paired with the customer record R2(10).

TABLE 8

| | | R1(2)-L2 Compare | | |
|---|---|---|---|---|
| C | R1 | R2 | Match Score | Paired |
| 1 | 2 | 1 | <96 | NO |
| 2 | 2 | 2 | <96 | NO |
| 3 | 2 | 3 | <96 | NO |
| 4 | 2 | 4 | <96 | NO |
| 5 | 2 | 5 | <96 | NO |
| 6 | 2 | 6 | <96 | NO |
| 7 | 2 | 7 | <96 | NO |
| 8 | 2 | 8 | <96 | NO |
| 9 | 2 | 9 | <96 | NO |
| 10 | 2 | 10 | 100 | YES |
| 11 | 2 | 11 | <96 | NO |

The comparison process continues by comparing, in comparing steps C(3,1), C(3,2), ..., C(3,11) one of the L1 records, R1(3), with the L2 records R2(1), R2(2), .., R2(11), excluding, however if desired the paired record R2(10) to form the corresponding match scores, Ms(2,1), MS(2,2), ..., MS(2,11), possible excluding MS(2,10) as already being paired. The results of the comparison and the match scores calculated are listed in TABLE 9. In TABLE 9, note that the match score, MS(3,11) for the comparison, C(3,11), is 97 indicating a non-exact match (because the dates are one day different) which exceeds the pairing threshold, $P_{match}$, value of 96 and therefore the bank record R1(3) is automatically paired with the customer record R2(11).

TABLE 9

| | | R1(3)-L2 Compare | | |
|---|---|---|---|---|
| C | R1 | R2 | Match Score | Paired |
| 1 | 3 | 1 | <96 | NO |
| 2 | 3 | 2 | <96 | NO |
| 3 | 3 | 3 | <96 | NO |
| 4 | 3 | 4 | <96 | NO |
| 5 | 3 | 5 | <96 | NO |
| 6 | 3 | 6 | <96 | NO |
| 7 | 3 | 7 | <96 | NO |
| 8 | 3 | 8 | <96 | NO |
| 9 | 3 | 9 | <96 | NO |
| 10 | 3 | 10 | <96 | NO |
| 11 | 3 | 11 | 97 | YES |

The comparison process continues by comparing, in comparing steps C(4,1), C(4,2), ..., C(4,11) one of the L1 records, R1(4), with the L2 records R2(1), R2(2), .., R2(11), excluding, however if desired the paired records. The results of the comparison and the match scores calculated Will all be below the exclusion threshold since the bank fee of record R1(4) has no corresponding record in L2.

The comparison process continues by comparing, in comparing steps C(1,1) C(1,2), ..., C(1,11) the unpaired one of the L1 records, R1(1), with the remaining unpaired ones of the L2 records R2(1), R2(2), ..., R2(11), excluding the paired records R2(10) and R2(11). Typically, the match score results of the initial comparison are saved so that the comparison is not required to be repeated. The results of the comparison and the match scores calculated are listed in TABLE 10. In TABLE 10, note that the match scores MS(1,1), MS(1,2) and MS(1,3) of 77, 67, and 57 for the L2 records R2(1), R2(2) and R2(3) all exceed the no-match exclusion threshold, $P_{nomatch}$. Therefore, the records R2(1), R2(2) and R2(3) are all part of the group presented to a user on a computer screen so that the user can select whether or not to pair one of the L2 customer records R2(1), R2(2) and R2(3) with the L1 bank record R1(1).

The likely pairing that would be selected is R1(1) and R2(1) since it appears that a digit-reversing error has appeared in the amount element (9188.00 or 1988.00) of either the bank or the customer record. Once a paring is selected, the user is enabled to correct the customer listing and to form a report that shows the reconciliation.

The process continues with the computer by permitting the user to enter any records into the customer list L2 corresponding to any unpaired records in the bank list. At this time the user would likely add a record corresponding to R1(4), the bank fee. The program displays records to the user in the order that is most probable for pairing records and account reconciliation.

TABLE 10

| | | L2 Customer List | | | | |
|---|---|---|---|---|---|---|
| R2 | Type | Date | Number | Amount | Match Score | Group |
| 1 | Deposit | 7/5/88 | | 9,188.00 | 77 | YES |
| 2 | Deposit | 7/6/88 | | 19,906.96 | 67 | YES |
| 3 | Deposit | 7/4/88 | | 9,733.49 | 57 | YES |
| 4 | Deposit | 7/7/88 | | 3,829.68 | 40 | NO |
| 5 | Check | 7/5/88 | 3391 | 214.50 | 43 | NO |
| 6 | Check | 7/5/88 | 3392 | 394.17 | 43 | NO |
| 7 | Check | 7/5/88 | 3393 | 214.34 | 43 | NO |
| 8 | Check | 7/5/88 | 3389 | 3,513.74 | 40 | NO |
| 9 | Check | 7/5/88 | 3390 | 4,687.53 | 40 | NO |

Further details of the method of the present invention are embodied in "Computer Program-Appendix A" attached to this specification.

What is claimed:

1. A method of reconciling in a computer a first list formed of a first number of first records in the computer with a second list formed of a second number of second records in the computer where, except for errors or omissions, each of said first records is identical to a corresponding one of said second records, the method comprising:

for each one of said first records, comparing said one of said first records with one or more of said second records to determine match scores, one match score for each compared one of said second records, each match score designating the probability said one of said first records corresponds to the compared one of said second records, for each one of said first records having a match score exceeding a predetermined pairing threshold, pairing said one of said first records with the compared one of said second records whereby said one of said first records and the compared one of said second records are reconciled, for each one of said first records not having a match score exceeding said predetermined pairing threshold, matching said one of said first records with a group of second records where said group of second records is determined based upon the magnitudes of corresponding match scores for said second records, accepting or rejecting the pairing of said one of said first records with one of said second records in said group whereby, upon accepting, said one of said first records and the compared one said second records are reconciled.

2. The method of reconciling the first list and the second list of claim 1 wherein said accepting step is performed under user control.

3. The method of reconciling the first list and the second list of claim 1 further including, for one or more of said first records not paired with a second record, adding under user control a new second record to said second list corresponding to one of said first records whereby said one of said first records and the compared one of said second records are reconciled.

4. The method of reconciling the first list and the second list of claim 1 wherein said matching step is performed by determining said group to include only ones of said second records having match scores between said pairing threshold and an exclusion threshold.

5. The method of reconciling the first list and the second list of claim 1 wherein said matching step is performed by determining said group to include only a limited number of ones of said second records and to include ones of said second records having match scores closest to said pairing threshold.

6. The method of reconciling the first list and the second list of claim 1 wherein, said first list L1 has N first records designated R1(1), R1(2), ..., R1(r1), ..., R1(N); where each one of said records R1(r1) is formed of P elements E1(1), E1(2), E1(3), ..., E1(e), ..., E1(P), said second list L2 has M second records designated R2(1), R2(2), ..., R2(r2), ..., R2(M); where each one of said records R2(r2) is formed of P elements E2(1), E2(2), E2(3), ..., E2(e), ..., E2(P), said comparing step is performed for each first record R1(r1) by Q element comparing steps C(q), for q from 1,2, ..., Q, whereby for each first record R1(r1) each of the first elements E1(e), for e from 1, 2, ..., U, is compared with each of the second elements E2(e), for e from 1, 2, ..., U, respectively, for the compared one of said second records R2(r2).

7. The method of reconciling the first list and the second list of claim 6 wherein the results of each element comparing step C(q) is a probability value P(1), for q from 1, 2, ..., Q, and where said match score is the SUM P(q) for q from 1, 2, ..., Q.

8. The method of reconciling the first list and the second list of claim 6 wherein said first list is a bank statement for a checking account, said second list is a customer's account information, and said elements include a date element, a check element and an amount element.

9. The method of reconciling the first list and the second list of claim 8 wherein said element comparing includes comparing to determine if the amount in the amount element of a first record R1(r1) is within an amount range of an amount in a corresponding amount element of a second record R2(r2).

10. The method of reconciling the first list and the second list of claim 9 wherein said element comparing for each first record R1(r1) with a second record R2(r2) includes, setting a probability value $P_{date}$ as a function of whether the date in the date element of said first record is within a date range of a date in a corresponding date element of said second record, setting a probability value $P_{amount}$ as a function of whether the amount in the amount element of said first record is within a amount rage of a amount in a corresponding amount element of said second record, setting a probability value $P_{number}$ as a function of whether the number in the number element of said first record is the same as the number in a corresponding number element of said second record, forming the match score MS equal to the sum of $P_{date}$, $P_{amount}$, and $P_{number}$.

11. The method of reconciling the first list and the second list of claim 9 wherein said element comparing for each first record R1(r1) with a second record R2(r2) includes, setting a Date Score, $P_{date}(d1,d2,c1)$, probability value as a function of comparing the dates in the date elements d1 and d2 of R1(r1) and R2(r2), respectively, as a function of the number element, c1, of record R1(r1), setting an Amount Score, $P_{amount}(a1,a2)$, probability value as a function of comparing the amounts in the amount elements a1 and a2 of records R1(r1) and R2(r2), respectively, setting a Number Score, $P_{number}(c1,c2)$, probability value as a function of comparing the numbers in the number elements c1 and c2 of the records R1(r1) and R2(r2), respectively, forming the match score MS(r1,r2) as follows:

if $P_{date}(d1,d2,c1) = 0$, MS(r1,r2) = 0.

if $P_{date}(d1,d2) = 0$, MS(r1,r2) = $(P_{date}(d1,d2,c1) + P_{amount}(a1,a2) + P_{number}(c1,c2))/3$.

12. The method of reconciling the first list and the second list of claim 11 wherein the Date Score, $P_{date}(d1,d2,c1)$, is determined as one of the date score probability values $sd_i$ where i has one of the values 1, 2, ..., 6 and where dd equals (d1−d2) as follows:

13. The method of reconciling the first list and the second list of claim 11 wherein the Amount Score, $P_{amount}(a1,a2)$, is determined as one of the amount score probability values $sa_i$ where i has one of the values 1, 2, ..., 26, where g1 equals the sign of a1, where g2 equals the sign of a2, where l1 equals the number of digits in a1, where l2 equals the number of digits in a2, where D equals the number of digits differing in a1 and a2, and where T equals the sum of the arithmetic digit-wise difference between a1 and a2 as follows:

14. The method of reconciling the first list and the second list of claim 11 wherein the Number Score, $P_{number}(c1, c2)$, is determined as one of the number score probability values $sn_i$, where i has one of the values 1, 2, ..., 6, as follows:

15. A method of reconciling in a computer a first list formed of a first number of first records in the computer with a second list formed of a second number of second records in the computer where, said first list L1 has N first records designated R1(1), R1(2), ..., R1(r1), ..., R1(N); where each one of said records R1(r1) is formed of P elements E1(1), E1(2), E1(3), ..., E1(e), ..., E1(P), said second list L2 has M second records designated R2(1), R2(2), ..., R2(r2), ..., R2(M); where each one of said records R2(r2) is formed of P elements E2(1), E2(2), E2(3), ..., E2(e), ..., E2(P), for each one of said first records, comparing said one of said first records with one or more of said second records to determine match scores, one match score for each compared one of said second records, each match score designating the probability said one of said first records corresponds to the compared one of said second records, and wherein said first list is a statement for a first listing of an account, said second list is a second listing of said account, and said elements include a date element and an amount element, said comparing step is performed for each first record R1(r1) by Q element comparing steps C(q), for q from 1, 2, ... Q, whereby for each first record R1(r1) each of the first elements E1(e), for e from 1, 2, ..., U, is compared with each of the second elements E2(e), for e from 1, 2, ..., U, respectively, for the compared one of said second records R2(r2), for each one of said first records having a match score exceeding a predetermined pairing threshold, pairing said one of said first records with the compared one of said second records whereby said one of said first records and the compared one of said second records are reconciled.

for each one of said first records not having a match score exceeding said predetermined pairing threshold, matching said one of said first records with a group of second records where said group of second records is determined based upon the magnitudes of corresponding match scores for said second records, accepting or rejecting the pairing of said one of said first records with one of said second records in said group whereby, upon accepting, said one of said first records and the compared one said second records are reconciled.

16. The method of reconciling the first list and the second list of claim 15 wherein said element comparing includes string match comparing to determine if an element of a first record R1(r1) is the same or as similar to a corresponding element of a second record R2(r2).

17. The method of reconciling the first list and the second list of claim 16 wherein said string match comparing includes comparing to detect added characters.

18. The method of reconciling the first list and the second list of claim 16 wherein said string match comparing includes comparing to detect missing characters.

19. The method of reconciling the first list and the second list of claim 16 wherein said string match comparing includes comparing to detect transposition of characters.

20. The method of reconciling the first list and the second list of claim 15 wherein said element comparing includes comparing to determine if the date in the date element of a first record R1(r1) is within a date range of date in a corresponding date element of a second record R2(r2).

21. A method of reconciling in a computer a first list formed of a first number of first records in the computer with a second list formed of a second number of second records in the computer where, except for errors or omissions, each of said first records is identical to a corresponding one of said second records, the method comprising, for each one of said first records, comparing said one of said first records with one or more of said second records to determine match scores, one match score for each compared one of said second records, each match score designating the probability said one of said first records corresponds to the compared one of said second records, for each one of said first records having a match score exceeding a predetermined pairing threshold, pairing said one of said first records with the compared one of said second records whereby said one of said first records and the compared one of said second records are reconciled, for each one of said first records having a match score between said predetermined pairing threshold and an exclusion threshold, matching said one of said first records with a group of second records where said group of second records is determined based upon the magnitudes of corresponding match scores for said second records, displaying to a user on a computer terminal said group of second records in an order based upon the magnitudes of corresponding match scores for said second records whereby the user is presented with records for pairing in the order of most likely correspondence of records, accepting or rejecting the pairing of said one of said first records with one of said second records in said group under user control whereby, upon accepting, said one of said first records and the compared one said second records are reconciled.

22. The method of reconciling the first list and the second list of claim 21 further including, for one or more of said first records not paired with a second record, adding under user control a new second record to said second list corresponding to one of said first records whereby said one of said first records and the compared one of said second records are reconciled.

23. The method of reconciling the first list and the second list of claim 21 further including generating a report summarizing the reconciliation results including a listing of unpaired records and balances of the first list and the second list.

24. The method of reconciling the first list and the second list of claim 21 further including the step of updating the second list to correct errors discovered as a result of reconciliation.

25. The method of reconciling the first list and the second list of claim 21 further including the step of updating the second list to add records as a result of reconciliation.

26. The method of reconciling the first list and the second list of claim 21 further including the step of updating the second list to indicate records in the second list paired with records in the first list as a result of reconciliation.

* * * * *